(12) United States Patent
Ogasawara et al.

(10) Patent No.: US 9,393,838 B2
(45) Date of Patent: Jul. 19, 2016

(54) ADHESIVE COMPOSITION, ADHESION METHOD, AND PNEUMATIC TIRE

(75) Inventors: Takuya Ogasawara, Tokyo (JP); Ryuji Nakagawa, Tokyo (JP); Kotaro Hayakawa, Tokyo (JP); Hideyuki Chiashi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 88 days.

(21) Appl. No.: 14/111,044

(22) PCT Filed: Apr. 2, 2012

(86) PCT No.: PCT/JP2012/058999
§ 371 (c)(1),
(2), (4) Date: Nov. 22, 2013

(87) PCT Pub. No.: WO2012/141035
PCT Pub. Date: Oct. 18, 2012

(65) Prior Publication Data
US 2014/0087110 A1 Mar. 27, 2014

(30) Foreign Application Priority Data
Apr. 15, 2011 (JP) ................................. 2011-091186

(51) Int. Cl.
*B65D 39/00* (2006.01)
*C08L 7/00* (2006.01)
(Continued)

(52) U.S. Cl.
CPC ................. *B60C 1/0008* (2013.04); *B60C 5/14* (2013.01); *C08L 7/00* (2013.01); *C08L 15/00* (2013.01);
(Continued)

(58) Field of Classification Search
CPC .... B60C 1/008; B60C 5/14; B60C 2005/145; C08L 7/00; C08L 15/00; C08L 2205/02; Y10T 428/1386; Y10T 428/31826; C09J 115/00

USPC ............... 428/36.8, 492, 355 AC, 354, 317.3, 428/355 EN, 355 R, 41.3, 1.54, 219, 327, 428/334, 339, 349, 356, 40.2, 41.8, 521, 428/138, 1.53, 1.55, 215, 220, 317.7, 345, 428/346, 34.1, 34.3, 351, 355 BL, 355 EP, 428/35.7, 36.6, 40.1, 413, 41.5, 457, 465, 428/483, 500, 513, 522; 525/236
See application file for complete search history.

(56) References Cited

U.S. PATENT DOCUMENTS

2004/0089388 A1* 5/2004 Fujino .................. B60C 1/0008
                                                                152/510
2005/0119399 A1    6/2005 Nishioka et al.
2008/0314491 A1* 12/2008 Soeda et al. .................. 152/510

FOREIGN PATENT DOCUMENTS

CN        1974621 A    6/2007
EP        1700882 A1   9/2006
(Continued)

OTHER PUBLICATIONS

Extended European Search Report issued Aug. 21, 2014 in corresponding European Patent Application No. 12771859.1.
(Continued)

*Primary Examiner* — Gwendolyn Blackwell
*Assistant Examiner* — Kevin Ortman, Jr.
(74) *Attorney, Agent, or Firm* — Sughrue Mion, PLLC (57) ABSTRACT

Provided are a pressure-sensitive adhesive composition comprising, as a rubber component, at least two modified rubbers modified with a polar functional group and having different modification rates with each other, a laminate body comprising (A) a resin film layer and (B) a rubber elastic body layer wherein they are adhered via (C) the said pressure-sensitive adhesive composition, and a pneumatic tire having the said laminate body as an inner liner layer; and thus, provided are the pressure-sensitive adhesive composition that can firmly bond between the resin film layer and the rubber elastic body layer while the laminate body obtained therefrom does not generate cracks at low temperature, the laminate body using the said pressure-sensitive adhesive composition, and the pneumatic tire.

7 Claims, 1 Drawing Sheet

(51) Int. Cl.
*B60C 1/00* (2006.01)
*B60C 5/14* (2006.01)
*C09J 115/00* (2006.01)
*C08L 15/00* (2006.01)

(52) U.S. Cl.
CPC ......... *C09J 115/00* (2013.01); *B60C 2005/145* (2013.04); *C08L 2205/02* (2013.01); *Y10T 428/1386* (2015.01); *Y10T 428/31826* (2015.04)

(56) References Cited

FOREIGN PATENT DOCUMENTS

| | | | | |
|---|---|---|---|---|
| GB | 2223019 A | * | 3/1990 | ............. C08C 19/06 |
| JP | 7-82418 | A | 3/1995 | |
| JP | 8-73699 | A | 3/1996 | |
| JP | 2004-176048 | A | 6/2004 | |
| JP | 2004-197031 | A | 7/2004 | |
| JP | 2005-290139 | A | 10/2005 | |
| JP | 2010-78988 | A | 4/2010 | |
| JP | 2010-215725 | A | 9/2010 | |
| WO | 2010/119685 | A1 | 10/2010 | |

OTHER PUBLICATIONS

International Search Report for PCT/JP2012/058999 dated Jun. 26, 2012 English Translation.

\* cited by examiner

ADHESIVE COMPOSITION, ADHESION METHOD, AND PNEUMATIC TIRE

CROSS REFERENCE TO RELATED APPLICATIONS

This application is a National Stage of International Application No. PCT/JP2012/058999 filed Apr. 2, 2012, claiming priority based on Japanese Patent Application No. 2011-091186 filed Apr. 15, 2011, the contents of all of which are incorporated herein by reference in their entirety.

TECHNICAL FIELD

The present invention relates to a pressure-sensitive adhesive composition, to an adhesion method, and to a pneumatic tire, or more specifically to a pressure-sensitive adhesive composition enabling firm bonding between a resin film layer and a rubber elastic body layer, to a method for adhering between a resin film layer and a rubber elastic body layer by using the said pressure-sensitive adhesive composition, and to a pneumatic tire having a laminate body formed by this method as an inner liner layer.

BACKGROUND ART

In order to prevent leakage of an air from occurring and to keep the air pressure in a tire at a certain level, the inner surface of a pneumatic tire is provided with an inner liner layer mainly comprised of a butyl-based rubber having low gas permeability such as a butyl rubber and a halogenated butyl rubber. As the social requirement for energy saving increases in recent years, in order to reduce the automobile tire weight, many methods to reduce thickness of the gauge of this inner liner layer have been proposed. As a method to reduce thickness of the gauge of the inner liner layer, for example, an attempt is made to use a member, which is obtained by integrally bonding a butyl rubber sheet with an ethylene-vinyl alcohol copolymer film having an excellent gas barrier property, as the material for the inner liner layer (for example, see Patent Literature 1). In this case, for the foregoing bonding, an adhesive is used.

As to the inner liner layer of this pneumatic tire, a technology to make use of a film comprising a thermoplastic resin and a thermoplastic elastomer has been known. However, this film is insufficient in adhesion with a neighboring rubber layer.

Therefore, a technology such as to apply a pressure-sensitive adhesive to a film thereby adhering it with a neighboring rubber layer has been known. For adhesion of this film with the neighboring rubber layer, commercially available adhesives such as "Metaloc R-46" (manufactured by Toyokagaku Kenkyusho Co., Ltd.) and "Chemlok© 6250" (manufactured by LORD Corporation.) have been used in the past; however, these commercially available adhesives contain lead and halogen, so that development of an adhesive having a lower environmental burden has been desired. In addition, the tackiness of these adhesives is so low that there has been a problem that the tire cannot be produced stably.

On the other hand, as a technology to reduce the tire weight wherein an insulation layer, having an excellent adhesion property with a carcass cord as well as a significantly improved gas barrier property, is disposed between the inner liner layer and the carcass layer so as to reduce the rubber thickness of the inner liner layer thereby reducing the tire weight, a rubber composition to form an insulation layer of a pneumatic radial tire, wherein the insulation layer contains 1.5 to 4.5 parts by mass of sulfur relative to 100 parts by mass of a rubber component which comprises 20 to 70% by mass of an epoxidized natural rubber having the epoxidation rate of 3 to 50% by mol and a diene rubber as the remainder thereof, has been disclosed (for example, see Patent Literature 2).

CITATION LIST

Patent Literature

Patent Literature 1: JP-A-2004-176048
Patent Literature 2: JP-A-7-82418

SUMMARY OF THE INVENTION

Technical Problem

In the technology described in Patent Literature 2, although the rubber component contains an epoxidized natural rubber having the epoxidation rate of 3 to 50% by mol, only one kind of the epoxidized natural rubber is contained therein; and on top of it, the content thereof is rather low as it is in the range of 20 to 70% by mass relative to the rubber component. If the epoxidized natural rubber with the content thereof being as mentioned above is used, a laminate body having a resin film layer and a rubber elastic body layer bonded firmly with the sufficient adhesion strength cannot be obtained.

If the epoxidation rate of the epoxidized natural rubber and the content thereof are made higher, a laminate body having the adhesion strength and the gas barrier property thereof improved may be obtained; but with this, E' (dynamic modulus) at low temperature becomes high in the laminate body so that there appears a tendency to readily generate cracks at low temperature. On the other hand, if the epoxidation rate of the epoxidized natural rubber and the content thereof are made lower, tackiness may be improved; but the adhesion strength in the laminate body becomes insufficient thereby causing a problem that the laminate body may be easily delaminated.

The present invention was made under the situation as mentioned above; and thus, the object of the present invention is to provide: a pressure-sensitive adhesive composition which can firmly bond between a resin film layer and a rubber elastic body layer while not generating cracks at low temperature in the obtained laminate body, a method for adhering between the resin film and the rubber elastic body by using the said pressure-sensitive adhesive composition, and a pneumatic tire having a laminate body formed by the said adhesion method as an inner liner layer.

Solution to Problem

Inventors of the present invention carried out an extensive investigation to achieve the object as mentioned above, and as a result, they found that the said object could be achieved by a pressure-sensitive adhesive composition to be used to bond between a resin film layer and a rubber elastic body, wherein the said composition comprises, as the rubber component, at least two modified rubbers that are modified with a polar functional group and have different modification rates with each other.

In addition, in the case that the said polar functional group is an epoxy group, when the epoxidation rate of each of the rubber components is set in certain ranges, the one with a low epoxidation rate suppresses increase of the low temperature E' (low temperature dynamic modulus) while keeping a rubber property, thereby not only preventing generation of cracks from occurring but also improving adhesion and tackiness with a rubber elastic body layer; on the other hand, the one with a high epoxidation rate can improve a gas barrier property as well as an adhesion with a resin film by action with a functional group in the resin film by making use of characteristics of the epoxidized rubber.

The present invention could be completed by these findings.

That is, the present invention provides:
(1) A pressure-sensitive adhesive composition comprising, as a rubber component, at least two modified rubbers modified with a polar functional group and having different modification rates with each other,
(2) the pressure-sensitive adhesive composition according to (1), comprising, as the rubber component, at least two modified natural rubbers having different modification rates with each other,
(3) the pressure-sensitive adhesive composition according to (1) or (2), wherein 80 to 100% by mass of the rubber component is the modified rubbers,
(4) the pressure-sensitive adhesive composition according to any of (1) to (3), wherein the modified rubber is a combination of at least two modified rubbers of (a) a modified rubber with the modification rate of 5 to 30% by mol and (b) a modified rubber with the modification rate of 40 to 90% by mol,
(5) the pressure-sensitive adhesive composition according to any of (1) to (4), wherein the composition further contains a vulcanizing agent, or a vulcanizing agent and a vulcanization accelerator,
(6) the pressure-sensitive adhesive composition according to any of (1) to (5), wherein the polar functional group is at least one kind selected from an epoxy group, an amino group, an imino group, a nitrile group, an ammonium group, an isocyanate group, an imido group, an amide group, a hydrazo group, an azo group, a diazo group, a hydroxyl group, a carboxyl group, a carbonyl group, an oxycarbonyl group, a sulfide group, a disulfide group, a sulfonyl group, a sulfinyl group, a thiocarbonyl group, a nitrogen-containing heterocyclic group, an oxygen-containing heterocyclic group, an alkoxy silyl group, and a tin-containing group,
(7) the pressure-sensitive adhesive composition according to any of (1) to (6), wherein the modified rubber is a modified natural rubber,
(8) a laminate body comprising (A) a resin film layer and (B) a rubber elastic body layer which are bonded together via (C) a layer of the pressure-sensitive adhesive composition according to any of (1) to (7), and
(9) a pneumatic tire having the laminate body according to (8) as an inner liner layer.

Advantageous Effects of Invention

The pressure-sensitive adhesive composition, the laminate body, the method for adhesion, and the pneumatic tire in the present invention have the following effects.
(i) The pressure-sensitive adhesive composition of the present invention contains, as a rubber component, at least two modified rubbers whose modification rates are different with each other; and thus, in the bonding between a resin film layer and a rubber elastic body layer, adhesion with the rubber elastic body layer can be improved by the modified rubber having a low modification rate, while the adhesion with the resin film layer can be improved by the modified rubber having a high modification rate.
(ii) In (i), by making 80 to 100% by mass of the rubber component to the modified rubbers, the adhesion strength with the resin film layer and the sustainability of the adhesive layer improve further, because the component of the polar functional group increases.
(iii) In (i), by using the low modification rate rubber with the modification rate of 5 to 30% by mol, increase of the low temperature E' can be suppressed while maintaining the rubber properties thereby preventing generation of cracks from occurring; and by using the high modification rate rubber with the modification rate of 40 to 90% by mol, a gas barrier property of the obtained laminate body can be improved by action with a functional group in the resin film by making use of characteristics of the modified rubber.
(iv) By making the pressure-sensitive adhesive composition in (i) contain further a vulcanizing agent, or a vulcanizing agent and a vulcanization accelerator, the pressure-sensitive adhesive composition is imparted with a vulcanization property.
(v) By using the pressure-sensitive adhesive composition having the effects of (i) to (iv), a laminate body firmly bonded between the resin film layer and the rubber elastic body layer can be obtained.
(vi) By making the resin film layer in (v) contain a certain copolymer or polymer, a laminate body having an excellent gas barrier property and being capable of giving a thinner gauge can be obtained.
(vii) By vulcanizing the resin film layer and the rubber elastic body layer under the state that the pressure-sensitive adhesive layer having the effects of (i) to (iv) intervenes therebetween, a method for adhering between the resin film layer and the rubber elastic body layer with high adhesion strength can be provided.
(viii) In (vii), as to the method to intervene the pressure-sensitive adhesive layer, the method wherein a pressure-sensitive adhesive coating solution is applied to the side of at least one of the counter members of the resin film layer and the rubber elastic body layer which are faced with each other, or the method wherein a sheet of the pressure-sensitive adhesive composition intervenes therebetween is effective.
(ix) By using the adhesion method having the effects of (vii) and (viii), a vulcanized laminate body wherein the resin film layer and the rubber elastic body layer are firmly bonded can be obtained efficiently.
(x) Owing to the above effects, a pneumatic tire having the vulcanized laminate body of (ix) as an inner liner layer can be obtained.

MODE FOR CARRYING OUT THE INVENTION

Firstly, the pressure-sensitive adhesive composition of the present invention will be explained.
1. Pressure-Sensitive Adhesive Composition The pressure-sensitive adhesive composition of the present invention is characterized by that the composition comprises, as the rubber component, at least two modified rubbers modified with a polar functional group and having different modification rates with each other, whereby the composition is used to bond between (A) a resin film layer and (B) a rubber elastic body layer. As to the polar functional group, an epoxy group, an amino group, an imino group, a nitrile group, an ammonium group, an isocyanate group, an imido group, an amide group, a hydrazo group, an azo group, a diazo group, a hydroxyl group, a carboxyl group, a carbonyl group, an oxycarbonyl group, a sulfide group, a disulfide group, a sulfonyl group, a sulfinyl group, a thiocarbonyl group, a nitrogen-containing heterocyclic group, an oxygen-containing heterocyclic group, an alkoxy silyl group, and a tin-containing group may be mentioned, while an epoxy group is especially preferable.

1.1 Rubber Component

As to the rubber component in the pressure-sensitive adhesive composition of the present invention, a modified natural rubber and/or a modified synthetic rubber may be mentioned, while a modified natural rubber is more preferable. Illustrative example of the modified synthetic rubber includes a modified polyisoprene rubber (IR), a modified polybutadiene rubber (BR), a modified styrene-butadiene copolymer (SBR), and a modified styrene-isoprene copolymer (SIR).

The rubber component in the pressure-sensitive adhesive composition of the present invention comprises preferably at least two epoxidized natural rubbers (hereinafter, this rubber is sometimes abbreviated as "ENR") having different epoxidation rates with each other.

The epoxidized natural rubber can be obtained by a reaction of a natural rubber latex with peracetic acid. By this reaction, the double bond present in the natural rubber molecule is epoxidized; and this structure can be acknowledged by a proton nuclear magnetic resonance spectrum (NMR) and an infrared spectrum (IR). From IR and elemental analysis, content of the epoxy group can be obtained.

Here, the epoxidation rate "A % by mol" means that A % of the double bond in a natural rubber is epoxidized. Meanwhile, the epoxidation rate means % by mol of the olefin unsaturated sites which are originally present in the rubber and converted to the oxirane; and this is sometimes referred to as "oxirane oxygen concentration". This can be measured, for example, by titration using hydrogen bromide in an acetic acid solution with an automatic titration instrument "GT-200" (trade name, manufactured by Mitsubishi Chemical Analytech Co., Ltd.); and the same is applied hereinafter.

As to the epoxidized natural rubber (ENR), a commercially available epoxidized natural rubber may be used, or a rubber obtained by epoxidizing a natural rubber may be used. A method for epoxidation of a natural rubber is not particularly restricted, while a method such as a chlorohydrin method, a direct oxidation method, a hydrogen peroxide method, an alkyl hydroperoxide method, and a peracid method may be used. Illustrative example of the peracid method includes a reaction in which a natural rubber is reacted with an organic peracid such as peracetic acid and performic acid.

This epoxidized natural rubber has a lower air permeability than a natural rubber; and thus, the air permeability tends to be lowered drastically by blending this epoxidized natural rubber.

1.1.1 ENR

In the pressure-sensitive adhesive composition of the present invention, by containing at least two ENRs whose modification rates are different with each other, in the bonding between a resin film layer and a rubber elastic body layer, adhesion with the rubber elastic body layer can be improved by ENR having a low epoxidation rate, while the adhesion with the resin film layer can be improved by ENR having a high epoxidation rate.

In the pressure-sensitive adhesive composition of the present invention, a combination of at least two kinds, i.e., (a) ENR having 5 to 30% by mol of the epoxidation rate and (b) ENR having 40 to 90% by mol of the epoxidation rate, is preferable as the ENRs whose epoxidation rates are different with each other; and in addition, content of the combined ENRs in the rubber component is preferably in the range of 80 to 100% by mass.

When content of the combined ENRs in the rubber component is in the range of 80 to 100% by mass, compatibility among components in the adhesive layer is enhanced; and as a result, the adhesion strength and sustainability of the adhesive layer are increased. Accordingly, content of the combined ENRs is more preferably in the range of 90 to 100% by mass, or most preferably 100% by mass.

In addition, by using ENR with the epoxidation rate of 5 to 30% by mol as the low epoxidation rate ENR, increase of the low temperature E' can be suppressed thereby preventing generation of cracks from occurring while maintaining properties of the natural rubber; and by using ENR with the epoxidation rate of 40 to 90% by mol as the high epoxidation rate natural rubber, a gas barrier property of the obtained laminate body can be improved by action with a functional group in the resin film by making use of characteristics of ENR.

In the present invention, the content ratio of the low epoxidation rate ENR to the high epoxidation rate ENR is preferably in the range of 20:80 to 80:20 by mass ratio in view of the balance of the respective effects as mentioned above.

1.1.2 High Diene Elastomer

The pressure-sensitive adhesive composition of the present invention may contain in the rubber component a high diene elastomer other than the above-mentioned ENR with the concentration thereof being preferably 20% or less by mass, or more preferably 10% or less by mass; but most preferably the said diene elastomer is not contained at all.

Illustrative example of the high diene elastomer includes a natural rubber, a synthetic isoprene rubber (IR), a cis-1,4-polybutadiene rubber (BR), a syndiotactic-1,2-polybutadiene rubber (1,2-BR), a styrene-butadiene rubber (SBR), an acrylonitrile-butadiene rubber (NBR), and a chloroprene rubber (CR).

These high diene elastomer may be used solely by selecting one kind of them, or as a combination of two or more kinds of them; and among them, a natural rubber, a synthetic isoprene rubber (IR), and a cis-1,4-polybutadiene rubber (BR) are preferable.

1.2 Vulcanizing Agent and Vulcanization Accelerator

In order to impart a vulcanization property to the pressure-sensitive adhesive composition of the present invention, the said composition may contain a vulcanizing agent, or a vulcanizing agent and a vulcanization accelerator.

As to the vulcanizing agent, sulfur and so forth may be mentioned; and the use amount thereof as sulfur is preferably in the range of 0.1 to 10.0 parts by mass, or more preferably in the range of 1.0 to 5.0 parts by mass, relative to 100 parts by mass of totality of the rubber component.

The vulcanization accelerator usable in the present invention is not particularly restricted, and illustrative example thereof includes a thiazole type such as M (2-mercaptobenzothiazole), DM (dibenzothiazolyl disulfide), and CZ (N-cyclohexyl-2-benzothiazolyl sulfenamide); and a guanidine type such as DPG (diphenyl guanidine). The use amount thereof is preferably in the range of 0.1 to 5.0 parts by mass, or more preferably in the range of 0.2 to 3.0 parts by mass, relative to 100 parts by mass of the rubber component.

1.3 Optional Component

The pressure-sensitive adhesive composition of the present invention may contain, in addition to the above-mentioned components, a filler, a tackifier resin, stearic acid, zinc oxide, an antioxidant, and so forth, if necessary.

1.3.1 Filler

As to the filler, an inorganic filler and/or carbon black may be used. There is no particular restriction as to the inorganic filler, while preferable example thereof includes silica by a wet process, aluminum hydroxide, aluminum oxide, magnesium oxide, montmorillonite, mica, smectite, organic montmorillonite, organic mica, and organic smectite. They may be used solely by selecting one kind of them, or as a combination of two or more kinds of them.

On the other hand, as to the carbon black, any kind used conventionally as a reinforcing material for a rubber may be used by appropriately selecting; and illustrative example thereof includes FEF, SRF, HAF, ISAF, SAF, and GPF.

In the pressure-sensitive adhesive composition of the present invention, in view of the tackiness and the delamination resistance, content of the filler is preferably 5 or more parts by mass of the inorganic filler together with the carbon black, relative to 100 parts by mass of the rubber component.

1.3.2 Tackifier Resin

Preferable example of the tackifier resin having a function to impart a tackifying property to the pressure-sensitive adhesive composition of the present invention includes a phenolic resin, a terpene resin, a modified terpene resin, a hydrogenated terpene resin, a rosin resin, C5 and C9 petroleum resins, a xylene resin, a cumarone-indene resin, a dicyclopentadiene resin, and a styrene resin, while among them a phenolic resin, a terpene resin, a modified terpene resin, a hydrogenated terpene resin, and a rosin resin are preferable.

Illustrative example of the phenolic resin includes a resin obtained by condensation of p-t-butylphenol with acetylene in the presence of a catalyst and a condensation product of an alkyl phenol with formaldehyde. Illustrative example of the terpene resin, the modified terpene resin, and the hydrogenated terpene resin includes terpene resins such as a β-pinene resin and an α-pinene resin; hydrogenated terpenes obtained by hydrogenation of these terpenes; and a modified terpene resin obtained by reacting a terpene with a phenol by a Friedel-Craft catalyst or by condensing it with formaldehyde. Illustrative example of the rosin resin includes a natural resin rosin and a rosin derivative obtained by modifying it by hydrogenation, disproportionation, dimerization, esterification, limerization, and the like These resins may be used solely by selecting one kind of them, or as a combination of two or more kinds of them, while a phenolic resin is especially preferable among them.

In the present invention, use amount of these tackifier resins is preferably 5 or more parts by mass, more preferably in the range of 5 to 40 parts by mass, or still more preferably in the range of 5 to 30 parts by mass, relative to 100 parts by mass of the rubber component.

Especially, use of a phenolic resin as the tackifier resin and magnesium oxide as the inorganic filler is preferable because the pressure-sensitive adhesive composition obtained therefrom shows excellent tackiness.

The pressure-sensitive adhesive composition of the present invention can be prepared by mixing each of the above-mentioned components by using, for example, a Banbury mixer and a roll.

The pressure-sensitive adhesive composition of the present invention obtained as mentioned above is used to bond between (A) a resin film layer and (B) a rubber elastic body layer.

Meanwhile, (A) the resin film layer and (B) the rubber elastic body layer mentioned above will be described in detail in the following explanation of the laminate body of the present invention.

2. Laminate Body

In the following, the laminate body of the present invention will be explained.

The laminate body of the present invention is characterized by that (A) a resin film layer and (B) a rubber elastic body layer are bonded via a layer of (C) the pressure-sensitive adhesive composition of the present invention as discussed above.

2.1 (A) Resin Film Layer

The resin film to constitute (A) the resin film layer in the laminate body of the present invention is not particularly restricted, and many kinds of a resin film can be used so far as the resin film layer has an excellent gas barrier property as well as an appropriate mechanical strength. Base material of the resin film like this contains any of the kinds selected from a polyamide, a polyester, a polynitrile, a polymethacrylate, a polyvinyl, a cellulose, an ethylene-vinyl alcohol-based copolymer, a urethane-based polymer, an olefin-based polymer, and a diene-based polymer. Among them, an ethylene-vinyl alcohol based copolymer is a preferable base material because of its low air permeability and excellent gas barrier property. They may be used solely by selecting one kind of them, or as a combination of two or more kinds of them. In addition, the resin film layer prepared by using these base materials may be monolayer, or multi-layers comprising two or more layers.

2.1.1 Ethylene-Vinyl Alcohol-Based Copolymer

As to the ethylene-vinyl alcohol based copolymer, the modified ethylene-vinyl alcohol copolymer obtained by reacting an epoxy compound to ethylene-vinyl alcohol copolymer is especially preferable. By so modifying, modulus of the unmodified ethylene-vinyl alcohol copolymer can be lowered drastically so that breakage during bending and generation of cracks can be suppressed.

As to the unmodified ethylene-vinyl alcohol copolymer used for this modification treatment, content of the ethylene unit therein is preferably in the range of 25 to 50% by mol. When content of the ethylene unit is 25% or more by mol, not only sufficient bending resistance and fatigue resistance can be obtained but also moldability under the molten state is excellent. On the other hand, when the content is 50% or less by mol, a sufficient gas barrier property can be obtained. From the view point to obtain further excellent bending resistance and fatigue resistance, content of the ethylene unit is more preferably 30% or more by mol, or particularly preferably 35% or more by mol. On the other hand, from the view point of the gas barrier property, content of the ethylene unit is more preferably 48% or less by mol, or particularly preferably 45% or less by mol.

In addition, the saponification rate of the ethylene-vinyl alcohol copolymer is preferably 90% or more by mol, more preferably 95% or more by mol, still more preferably 98% or more by mol, or utmost preferably 99% or more by mol. When the saponification rate is 90% or more by mol, a sufficient gas barrier property and heat stability during formation of the laminate body can be obtained.

The melt flow rate (MFR, MFR is measured at 190° C. with the applied load of 21.18 N) of the unmodified ethylene-vinyl alcohol copolymer to be used for the modification treatment is in the range of 0.1 to 30 g/10-minutes, or more preferably in the range of 0.3 to 25 g/10-minutes. Meanwhile, in the case that melting point of the ethylene-vinyl alcohol copolymer is near 190° C. or higher than 190° C., the measurements thereof are made at several temperatures above the melting point with the applied load of 21.18 N; and the inverse number of the absolute temperature is plotted in the horizontal axis, while the logarithmic value of MFR is plotted in the vertical axis in the single logarithmic graph, whereby the value obtained by extrapolating to 190° C. is shown.

The modification treatment is carried out by reacting an epoxy compound with the unmodified ethylene-vinyl alcohol copolymer with the amount of the epoxy compound being preferably in the range of 1 to 50 parts by mass, more preferably in the range of 2 to 40 parts by mass, or still more preferably in the range of 5 to 35 parts by mass, relative to 100 parts by mass of the unmodified copolymer. During this treatment, it is advantageous if the reaction is carried out in a solution by using an appropriate solvent.

In the modification treatment method by using the solution reaction, the modified ethylene-vinyl alcohol copolymer can be obtained by reacting an epoxy compound with the ethylene-vinyl alcohol copolymer in solution in the presence of an acid catalyst or a base catalyst. As to the reaction solvent, non-protonic polar solvents that are good solvents for the ethylene-vinyl alcohol copolymer, such as dimethyl sulfoxide, dimethyl formamide, dimethyl acetamide, and N-methyl pyrrolidone, are preferable. Illustrative example of the reaction catalyst includes acid catalysts such as p-toluenesulfonic acid, methanesulfonic acid, trifluoromethanesulfonic acid, sulfuric acid, and boron trifluoride; and base catalysts such as sodium hydroxide, potassium hydroxide, lithium hydroxide, and sodium methoxide. Among them, an acid catalyst is preferably used. Amount of the catalyst in the range of about 0.0001 to about 10 parts by mass relative to 100 parts by mass of the ethylene-vinyl alcohol copolymer may be appropriate. Alternatively, the modified ethylene-vinyl alcohol copolymer may be prepared by heat treatment of the solution in which the ethylene-vinyl alcohol copolymer and an epoxy compound are dissolved in a reaction solvent.

The epoxy compound used in the modification treatment is not particularly restricted, while a monovalent epoxy compound is preferable. When an epoxy compound with the valency of two or more is used, a crosslinking reaction with the ethylene-vinyl alcohol copolymer takes place, so that there may be a fear of deterioration of quality of the laminate body due to generation of a gel, a foreign spot, and so forth. In view of easiness in production, a gas barrier property, a bending resistance, and a fatigue resistance of the modified ethylene-vinyl alcohol copolymer, glycidol and epoxy propane may be mentioned as the preferable monovalent epoxy compounds.

The melt flow rate (MFR, MFR is measured at 190° C. with the applied load of 21.18 N) of the modified ethylene-vinyl alcohol copolymer to be used in the present invention is not particularly restricted, while it is preferably in the range of 0.1 to 30 g/10-minutes, more preferably in the range of 0.3 to 25 g/10-minutes, or still more preferably in the range of 0.5 to 20 g/10-minutes, from the view point to obtain a good gas barrier property, bending resistance, and fatigue resistance. Meanwhile, in the case that melting point of the modified ethylene-vinyl alcohol copolymer is near 190° C. or higher than 190° C., the measurements thereof are made at several temperatures above the melting point with the applied load of 21.18 N; and the inverse number of the absolute temperature is plotted in the horizontal axis, while the logarithmic value of MFR is plotted in the vertical axis in the single logarithmic graph, whereby the value obtained by extrapolating to 190° C. is shown.

The oxygen permeability of the resin film layer using this modified ethylene-vinyl alcohol copolymer as the base material is preferably $3 \times 10^{-15}$ cm$^3 \cdot$cm/cm$^2 \cdot$sec$\cdot$Pa or less, more preferably $1 \times 10^{-15}$ cm$^3 \cdot$cm/cm$^2 \cdot$sec$\cdot$Pa or less, or still more preferably $5 \times 10^{-16}$ cm$^3 \cdot$cm/cm$^2 \cdot$sec$\cdot$Pa or less, when the measurement thereof is done at 20° C. and 65% RH.

2.1.2 Structure of (A) Resin Film Layer (A) The resin film layer of the laminate body of the present invention may be a monolayer film comprised of a resin film such as the above-mentioned modified ethylene-vinyl alcohol copolymer, or a multilayer film comprised of, as the resin film layer, not only a resin film layer such as the modified ethylene-vinyl alcohol copolymer but also other layers.

As to the other layers, in view of water resistance and adhesion with a rubber, a layer comprised of a thermoplastic urethane elastomer is preferable; especially it is preferable to dispose the thermoplastic urethane elastomer layer in the outer layer parts in such a manner as to sandwich the resin film layer.

As to the specific example of the multilayer film like this, a multilayer film having a three-layer structure in which both sides of the resin film comprising the foregoing modified ethylene-vinyl alcohol copolymer are laminated respectively with the thermoplastic urethane elastomer films may be mentioned.

The thermoplastic urethane elastomer as mentioned above (this is sometimes abbreviated as TPU) is the elastomer having an urethane group (—NH—COO—) in the molecule thereof, which can be formed by an intermolecular reaction of three components of (1) a polyol (long chain diol), (2) a diisocyanate, and (3) a short chain diol. The polyol and the short chain diol are reacted with the diisocyanate by an addition reaction to form a linear polyurethane. In this molecule, the polyol becomes a soft part (soft segment) of the elastomer, while the diisocyanate and the short chain diol become a hard part (hard segment). Properties of TPU are dependent on the form of raw materials, polymerization conditions, and blending ratio, while among them the type of the polyol is the most significant factor to affect the TPU properties. Many of the basic properties thereof are determined by the type of the long chain diol, while the hardness is controlled by the ratio of the hard segment.

Illustrative example of the types thereof includes (i) a caprolactone type (polylactone ester polyol obtained by ring-opening of a caprolactone), (ii) an adipic acid type or an adipate type (adipate ester polyol obtained by reaction between adipic acid and glycol), and (iii) a PTMG type (polytetramethylene glycol) or an ether type (polytetramethylene glycol obtained by ring-opening polymerization of tetrahydrofurane).

In the laminate body of the present invention, a method for molding the resin film that constitutes (A) the resin film layer is not particularly restricted; and in the case of a monolayer film, heretofore known methods such as a solution casting method, a melt extrusion method, and a calendar method may be used, while among them a melt extrusion method such as a T-die method and an inflation method is preferable. In the case of a multilayer film, a laminating method by co-extrusion is preferably used.

The above-mentioned modified ethylene-vinyl alcohol copolymer is preferably crosslinked. When a modified ethylene-vinyl alcohol copolymer not crosslinked is used for the resin film layer, the layer comprised of the modified ethylene-vinyl alcohol copolymer is significantly deformed, for example, in the vulcanization process during manufacturing of a tire, so that a uniform layer cannot be maintained; and as a result, there are certain instances that the gas barrier properties, the bending resistance, and the fatigue resistance of the resin film layer are deteriorated.

Here, the crosslinking method of the modified ethylene-vinyl alcohol copolymer is not particularly restricted, while a method of irradiating an energy beam may be mentioned. As to the energy beam, ionized radiation beams such as an ultraviolet ray, an electron beam, an X-ray, an α-ray, and a γ-ray may be mentioned, while an electron beam is especially preferable among them.

Irradiation of the electron beam is preferably done after the modified ethylene-vinyl alcohol copolymer is processed to a molded article such as a monolayer film or a multilayer sheet by the method mentioned above. Here, dose amount of the electron beam irradiated for crosslinking is preferably in the range of 10 to 60 Mrad, or more preferably in the range of 20 to 50 Mrad. If the irradiated dose amount is less than 10 Mrad, the crosslinking reaction becomes sluggish, while if the amount is more than 60 Mrad, the molded article is readily deteriorated.

Thickness of (A) the resin film layer in the laminate body of the present invention is, when this laminate body is used as an inner liner layer of a pneumatic tire, preferably 200 μm or less in order to obtain a thinner gauge. If the resin film layer is too thin, there appears a fear that sufficient effects of bonding (A) this layer with (B) the rubber elastic body layer that will be described later cannot be adequately expressed. Accordingly, the lower limit of the thickness of (A) this layer is about 1 μm; and the thickness thereof is more preferably in the range of 10 to 150 μm, or still more preferably in the range of 20 to 100 μm.

In order to enhance the adhesion property with the foregoing pressure-sensitive adhesive composition layer which intervenes between (A) this resin film layer and (B) the rubber elastic body layer that will be described later, the resin film layer may be surface-treated, if necessary at least on its adhesion side with the pressure-sensitive adhesive layer, by an oxidation method, a concavo-convex method, and the like.

Illustrative example of the oxidation method includes a corona discharge treatment, a plasma discharge treatment, a chromic acid treatment (wet method), a flame treatment, a hot air treatment, an ozone and UV ray irradiation treatment. Illustrative example of the concavo-convex method includes a sand blast method and a solvent dissolution method. These surface treatment methods may be appropriately selected in accordance with the kind of the base film, while in general a corona discharge method is preferably used in view of its effect and operational convenience.

2.2 (B) Rubber Elastic Body Layer (B) The rubber elastic body layer in the laminate body of the present invention contains preferably a butyl rubber and a halogenated butyl rubber as the rubber component. Here, illustrative example of the halogenated butyl rubber includes a chlorinated butyl rubber, a brominated butyl rubber, and a modified rubber of them. As to these halogenated butyl rubber, a commercially available product may be used; and illustrative example of the commercially available product includes "ENJAY BUTYL HT10-66" (registered trade name of the chlorinated butyl rubber manufactured by Enjay Chemical Company), "BROMOBUTYL 2255" (registered trade name of the brominated butyl rubber manufactured by JSR Corporation), and "BROMOBUTYL 2244" (registered trade name of the brominated butyl rubber manufactured by JSR Corporation). Illustrative example of the modified rubber that is chlorinated or brominated includes "EXPRO 50" (registered trade name, manufactured by Exxon Mobil Corporation)

In view of improving the gas barrier property, content of the butyl rubber and/or the halogenated butyl rubber in the rubber component of the rubber elastic body layer is preferably 50% or more by mass, or more preferably in the range of 70 to 100% by mass. Meanwhile, in addition to the butyl rubber and the halogenated butyl rubber, a diene rubber, an epichlorohydrin rubber, and the like may be used as the rubber component. These rubber components may be used solely by selecting one kind of them, or as a combination of two or more kinds of them.

Specific example of the diene rubber includes a natural rubber (NR), an isoprene rubber (IR), a cis-1,4-polybutadiene rubber (BR), a syndiotactic 1,2-polybutadiene rubber (1,2-BR), a styrene-butadiene copolymer rubber (SBR), an acrylonitrile-butadiene rubber (NBR), and a chloroprene rubber (CR). These diene rubbers may be used solely by selecting one kind of them, or as a combination of two or more kinds of them.

In accordance with the purpose, if necessary, the rubber elastic body layer may be blended with, in addition to the above-mentioned rubber components, ingredients usually used in the rubber industry, such as a reinforcing filler, a softening agent, an antioxidant, a vulcanizing agent, a vulcanization accelerator for rubber, an anti-scorch material, zinc oxide, and stearic acid. As to these ingredients, commercially available products may be suitably used.

The rubber elastic body layer may be made to contain organic short fibers as necessary. In the case that the laminate body of the present invention is used as an inner liner layer, by containing the organic short fibers therein, exposure of inner cords that occurs during manufacturing of a tire when the gauge of the inner liner layer is made thin may be suppressed. The organic short fibers having an average diameter of 1 to 100 μm and an average length of about 0.1 to about 0.5 mm are preferable. The organic short fibers may be blended as FRR (composite material of short fibers with an unvulcanized rubber).

Content of the organic short fibers like this is preferably in the range of 0.3 to 15 parts by mass relative to 100 parts by mass of the rubber component. As to the material of the organic short fibers, there is no particular restriction; and illustrative example thereof includes polyamides such as nylon 6 and nylon 66, syndiotactic-1,2-polybutadiene, isotactic polypropylene, and polyethylene, while polyamides are preferable among them.

In order to enhance the modulus of the rubber that is blended with the organic short fibers, an adhesion enhancer between the fibers and the rubber, such as hexamethylene tetramine and resorcine, may be further blended therein.

In the laminate body of the present invention, it is preferable that thickness of the resin film layer be 200 μm or less, and that thickness of the rubber elastic body layer be 200 μm or more. Here, the lower limit of the thickness of the resin film layer is preferably about 1 μm, while the thickness thereof is more preferably in the range of 10 to 150 μm, or still more preferably in the range of 20 to 100 μm. When the laminate body of the present invention is used as the inner liner, if the thickness of the resin film layer is more than 200 μm, the bending resistance and the fatigue resistance thereof is deteriorated so that breakage and cracks may be readily resulted by bending deformation during driving rotation of the tire. On the other hand, if the thickness thereof is less than 1 μm, there is a chance that the gas barrier property cannot be sufficiently secured. If the thickness of the rubber elastic body layer is less than 200 μm, the reinforcing effect cannot be satisfactorily expressed, so that the cracks formed from the breakage and cracks in the resin film layer may be extended readily; and as a result, suppression of the adverse effects such as large breakage and cracks may become difficult.

The laminate body of the present invention is formed by bonding between (A) the resin film layer and (B) the rubber elastic body layer via the layer of the pressure-sensitive adhesive composition of the present invention as discussed before, wherein thickness of the pressure-sensitive adhesive composition layer is preferably in the range of 5 to 100 µm. If thickness of this pressure-sensitive adhesive composition layer is less than 5 µm, there is a fear of causing poor adhesion, while if this thickness is more than 100 µm, merits in weight saving and cost reduction become smaller.

The laminate body of the present invention obtained as mentioned above is in the unvulcanized state in both of (B) the rubber elastic body layer and the pressure-sensitive adhesive composition layer; and the elastic body can be used, for example, as the member material for the inner liner of a pneumatic tire.

To produce a vulcanized laminate body, the unvulcanized laminate body is heated for vulcanization at the temperature of usually 120° C. or higher, preferably in the range of 125 to 200° C., or more preferably in the range of 130 to 180° C. This treatment of heating for vulcanization is carried out usually during the time of vulcanization of a tire.

In the case that the laminate body is heated for vulcanization during the time of vulcanization of a tire, heating for vulcanization is carried out while the rubber elastic body side of the laminate body is contacted with a coating rubber layer of a carcass ply to form an inner liner bonded to the coating rubber.

In the following, the method for adhering between the resin film layer and the rubber elastic body layer in the present invention will be explained.

3. Method for Adhering Between the Resin Film Layer and the Rubber Elastic Body Layer The method for adhering between the resin film layer and the rubber elastic body layer in the present invention is characterized by that the vulcanization treatment is done under the condition wherein (C) the layer of the pressure-sensitive adhesive composition of the present invention intervenes between (A) the resin film layer and (B) the rubber elastic body layer.

(A) The resin film layer, (B) the rubber elastic body layer, and (C) the pressure-sensitive adhesive composition layer are those as explained before.

In this method for adhesion, as to the method for intervening the pressure-sensitive adhesive composition layer between (A) layer and (B) layer, for example, a method wherein a pressure-sensitive adhesive coating solution having the pressure-sensitive adhesive composition dissolved in a good solvent is applied to the side of at least one of the counter members of the resin film layer and the rubber elastic body layer which are faced with each other may be used.

As to the good solvent, an organic solvent having the δ-value, the Hildebrand solubility parameter, in the range of 14 to 20 $MPa^{1/2}$, indicating a good solvent to the rubber component, is preferably used. Illustrative example of the organic solvent like this includes toluene, xylene, n-hexane, cyclohexane, chloroform, and methyl ethyl ketone. These may be used solely by selecting one kind of them, or as a mixture of two or more kinds of them.

The solid concentration of the coating solution thus prepared is appropriately selected in accordance with its coating and handling properties, while the concentration is usually in the range of 5 to 50% by mass, or preferably in the range of 10 to 30% by mass.

Alternatively, a method wherein a sheet of the pressure-sensitive adhesive composition intervenes between the resin film layer and the rubber elastic body layer may be used.

Further, the present invention provides not only the vulcanized laminate body formed by the method for adhering between the resin film layer and the rubber elastic body layer but also a pneumatic tire having the said vulcanized laminate body as the inner liner layer.

4. Pneumatic Tire

Figure 1:
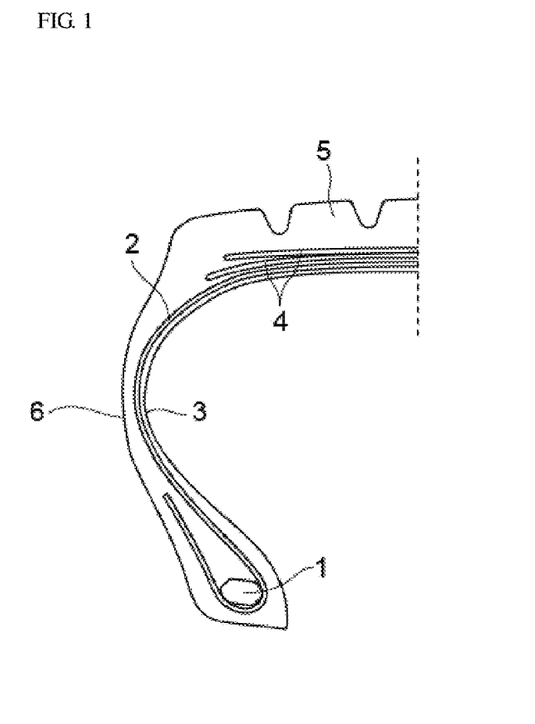
FIG. 1 is a partial cross section view showing one example of the pneumatic tire of the present invention.

FIG. 1 is a partial cross section view showing one example of the pneumatic tire having the vulcanized laminate body of the present invention as the inner liner layer, wherein the said tire comprises the carcass layer 2 having a carcass ply which is wound up around the bead core 1 with the cord direction being toward the radial direction, the inner liner layer 3 formed of the vulcanized laminate body of the present invention disposed inside the tire radial direction of the carcass layer, the belt part 4 comprised of two belt layers disposed outside the tire radial direction of the crown part of the carcass layer, the tread part 5 disposed on the upper belt part, and the side wall part 6 disposed at the right and the left sides of the tread part.

Figure 2:
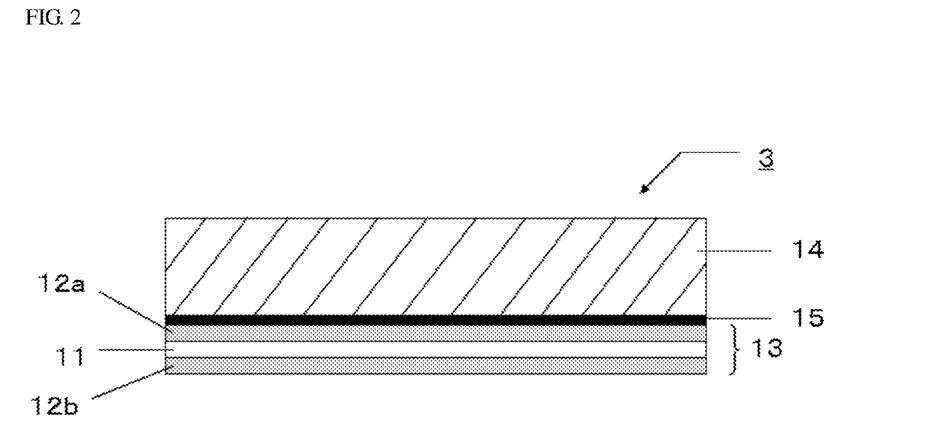
FIG. 2 is a detailed cross section view showing one example of the structure of the laminate body of the present invention.

FIG. 2 is a detailed cross section view showing one example which uses the vulcanized laminate body of the present invention as the inner liner layer in the pneumatic tire. The inner liner layer 3 is formed by bonding, via the layer 15 of the pressure-sensitive adhesive composition of the present invention, between the rubber elastic body layer 14 and the resin film layer 13 comprising the thermoplastic urethane elastomer layers 12a and 12b laminated on both sides of the modified ethylene-vinyl alcohol copolymer layer 11 so as to have an integrated structure. Then, the rubber elastic body layer 14 is bonded, on its opposite side to the resin film layer 13, to the carcass layer 2 in FIG. 1.

Meanwhile, in this vulcanized laminate body, as mentioned before, the unvulcanized laminate body is heated for vulcanization during the time of vulcanization of the tire on the tire molding machine to vulcanize both the pressure-sensitive adhesive composition layer and the rubber elastic body layer thereby bonding the resin film layer 13 with the vulcanized rubber elastic body layer 14 with a high adhesion strength; and at the same time, the vulcanized rubber elastic body layer 14 is bonded, on its opposite side to the resin film layer 13, to the carcass layer 2 in FIG. 1.

As mentioned above, the pressure-sensitive adhesive composition of the present invention can be suitably used for preparation of the unvulcanized laminate body as well as the vulcanized laminate body; and in addition, for example, after it is applied to surface of a unvulcanized rubber material, both of them are co-vulcanized so that it can be used to modify the surface of the vulcanizing rubber material (such as to impart an anti-static property). Further, this composition may be used to impart tackiness to an unvulcanized rubber member material in the belt form for a tire, such as a stiffener, a rubber chaffer, and a cushion side, by applying thereof to surface of the unvulcanized rubber material.

Alternatively, after a covering layer comprised of this pressure-sensitive adhesive composition is formed on the steel cord, this is introduced into a rubber matrix, and then they are co-vulcanized so that it can be used to firmly adhere between the steel cord and the rubber matrix.

EXAMPLES

In the following, the present invention will be explained in more detail by EXAMPLES, but the present invention is not restricted by these EXAMPLES at all.

Adhesion strength (N/25-mm) of the laminate body prepared in each EXAMPLE was measured by the T-type peeling test at 23° C. in accordance with the "Adhesive Material—Test Method of Peeling Adhesion Strength—Part 3: T-Type Peeling" described in JIS K 6854-3:1999.

Production Example 1

Synthesis of Modified Ethylene-Vinyl Alcohol Copolymer (Modified EVOH)

Into a pressure vessel for reaction were taken 2 parts by mass of ethylene-vinyl alcohol copolymer (ethylene content of 44% by mol, saponification rate of 99.9%, MFR of 5.5 g/10-minutes at 190° C. with the applied load of 21.18 N) and 8 parts by mass of N-methyl-2-pyrrolidone; and then, they were heated with stirring at 120° C. for 2 hours to dissolve the ethylene-vinyl alcohol copolymer completely. After 0.4 parts by mass of epoxypropane was added into it as the epoxy compound, the resulting mixture was heated at 160° C. for 4 hours. After completion of the heating, this mixture was precipitated by pouring into 100 parts by mass of distilled water; and then, N-methyl-2-pyrrolidone and unreacted epoxy propane were fully washed out by using a large quantity of distilled water to obtain the modified ethylene-vinyl alcohol copolymer. The modified ethylene-vinyl alcohol copolymer thus obtained was pulverized by a pulverizing machine to particles with particle diameter of about 2 mm; and then, the particles were fully washed again by using a large quantity of water. The particles after washing were dried under vacuum at room temperature for 8 hours, and then, they were melted by using a double axial extruder at 200° C. and pelletized.

Meanwhile, ethylene content and saponification rate of the foregoing ethylene-vinyl alcohol copolymer were calculated from the spectrum of $^1$H-NMR measured by "JNM-GX-500 Type" (manufactured by JEOL Ltd.) by using deuterated dimethyl sulfoxide as a solvent. The melt flow rate (MFR) of the ethylene-vinyl alcohol copolymer was measured by using Melt Indexer L244 (manufactured by Takara Kogyo Co., Ltd.) as following: a sample was packed into a cylinder having the inner diameter of 9.55 mm and the length of 162 mm; and after it was melted at 190° C., amount of the resin extruded per a unit time (g/10-minutes) through a 2.1-mm diameter orifice disposed in the center of the cylinder while a load was applied uniformly thereonto by using a plunger with the weight of 2160 g and the diameter of 9.48 mm. Meanwhile, in the case that melting point of the ethylene-vinyl alcohol copolymer was near 190° C. or higher than 190° C., the measurements thereof were made at several temperatures above the melting point with the applied load of 2160 g; and the inverse number of the absolute temperature is plotted in the horizontal axis, while the logarithmic value of MFR is plotted in the vertical axis in the single logarithmic graph, whereby the value calculated by extrapolating to 190° C. was taken as the melt flow rate (MFR).

Production Example 2

Preparation of Three-Layer Film

The modified EVOH obtained in Production Example 1 and thermoplastic polyurethane (TPU) "KURAMIRON 3190" (manufactured by Kuraray Co., Ltd.) were co-extruded by using a three-layer co-extrusion machine for two kinds under the co-extrusion conditions shown below to obtain a film layer having the three-layer structure (TPU layer/modified EVOH layer/TPU layer). Film thickness of respective layers, i. e., the TPU layer as well as the EVOH layer, were 20 μm.

Extrusion temperatures of each resin: C1/C2/C3/die=170/170/220/220° C.

Specifications of the Extrusion Machines for Each Resin:
    Thermoplastic polyurethane: "P25-18AC" (25-mmφ extruder, manufactured by Osaka Seiki Kousaku Co., Ltd.)
    Modified EVOH: "CO-EXT" (20-mmφ extruder of laboratory ME type, manufactured by Toyo Seiki Seisakusho, Ltd.)
    T-die specification: this is for two kinds and three-layers with width of 500 mm (manufactured by Plastics Technology Co., Ltd.)
    Temperature of the cooling roll: 50° C.
    Pulling rate: 4 m/minute

Production Example 3

Preparation of Unvulcanized Rubber Elastic Body Layer

The rubber composition with the following blending ratio was prepared; and then, the unvulcanized rubber elastic body sheet having thickness of 500 μm was obtained by using this composition.

Rubber Composition:
    Natural rubber: 30 parts by mass
    Brominated butyl rubber (BROMOBUTYL 2244, manufactured by JSR Corporation): 70 parts by mass
    GRF carbon black (#55, manufactured by Asahi Carbon, Co., Ltd.): 60 parts by mass
    SUNPAR 2280 (manufactured by Japan Sun Oil Co., Ltd.): 7 parts by mass
    Stearic acid (manufactured by ADEKA Corp.): 1 part by mass
    Vulcanization accelerator (Nocceler DM, manufactured by Ouchi Shinko Chemical Industrial Co., Ltd.): 1.3 parts by mass
    Zinc oxide (manufactured by Hakusuitech Co., Ltd.): 3 parts by mass
    Sulfur (manufactured by Karuizawa Seirensho Co., Ltd.): 0.5 parts by mass

Examples 1 to 10 and Comparative Examples 1 to 4

(1) Preparation of Pressure-Sensitive Adhesive Coating Solution

After respective components with the kinds and the amounts thereof shown in Table 1 were kneaded according to a usual method, 1000 parts by mass of toluene (δ-value of 18.2 MPa$^{1/2}$) was added to it for dissolution or dispersion to obtain 7 kinds of the pressure-sensitive adhesive coating solution.

(2) Preparation of Vulcanized Laminate Body

By using the electron beam irradiation instrument "Curetron EBC200-100 for production" (manufactured by NHV Corporation.), the three-layer film obtained in Production Example 2 was irradiated for crosslinking with the electron beam under the condition of the dose energy of 30 Mrad and the acceleration voltage of 200 kV; and thereafter, each of the pressure-sensitive adhesive composition coating solution was applied to one side of the film, dried, and then bonded on it with the unvulcanized rubber elastic body sheet obtained in Production Example 3 to obtain 7 kinds of the unvulcanized laminate body.

Then, each of the unvulcanized laminate bodies was heated for vulcanization at 160° C. for 20 minutes to obtain each of the vulcanized laminate bodies of EXAMPLES 1 to 10 and COMPARATIVE EXAMPLES 1 to 4. Adhesion strength of each of the vulcanized laminate bodies was measured by the method as mentioned before. These results are shown in Table 1.

EXAMPLES 1 to 3 in which only ENR was used as the rubber component while the epoxidized natural rubber was used as a combination of the epoxidized natural rubber having the epoxidation rate of 5 to 30% by mol and the epoxidized natural rubber having the epoxidation rate of 40 to 90% by mol showed higher adhesion strength than the vulcanized laminates of EXAMPLES 4 to 10 wherein BR was blended

TABLE 1

| | | COMPARATIVE EXAMPLE 1 | COMPARATIVE EXAMPLE 2 | EXAMPLE 1 | EXAMPLE 2 | EXAMPLE 3 | EXAMPLE 4 | EXAMPLE 5 |
|---|---|---|---|---|---|---|---|---|
| Ingredients in pressure-sensitive adhesive composition coating solution (parts by mass) | ENR 25[1] | 70 | — | 75 | 50 | 25 | 65 | 55 |
| | ENR 50[2] | — | 70 | 25 | 50 | 75 | 25 | 25 |
| | ENR 10[3] | — | — | — | — | — | — | — |
| | ENR 60[4] | — | — | — | — | — | — | — |
| | NR (RSS#3) | 30 | 30 | — | — | — | — | — |
| | BR[5] | — | — | — | — | — | 10 | 20 |
| | Carbon black[6] | 30 | 30 | 30 | 30 | 30 | 30 | 30 |
| | Stearic acid | 1 | 1 | 1 | 1 | 1 | 1 | 1 |
| | Zinc oxide | 3 | 3 | 3 | 3 | 3 | 3 | 3 |
| | Tackifier resin[7] | 10 | 10 | 10 | 10 | 10 | 10 | 10 |
| | Antioxidant[8] | 1 | 1 | 1 | 1 | 1 | 1 | 1 |
| | Vulcanization accelerator[9] | 1.5 | 1.5 | 1.5 | 1.5 | 1.5 | 1.5 | 1.5 |
| | Sulfur | 1.05 | 1.05 | 1.05 | 1.05 | 1.05 | 1.05 | 1.05 |
| Adhesion strength (N/25-mm) | | 20 | 30 | 90 or more* | 80 or more* | 85 or more* | 65 | 60 |
| State of peeling | | Interfacial peeling | Interfacial peeling | Matrix destruction | Matrix destruction | Matrix destruction | Interfacial peeling | Interfacial peeling |

| | | EXAMPLE 6 | COMPARATIVE EXAMPLE 3 | COMPARATIVE EXAMPLE 4 | EXAMPLE 7 | EXAMPLE 8 | EXAMPLE 9 | EXAMPLE 10 |
|---|---|---|---|---|---|---|---|---|
| Ingredients in pressure-sensitive adhesive composition coating solution (parts by mass) | ENR 25[1] | 30 | — | — | — | — | — | — |
| | ENR 50[2] | 40 | — | — | — | — | — | — |
| | ENR 10[3] | — | 70 | — | 30 | 50 | 65 | 55 |
| | ENR 60[4] | — | — | 70 | 40 | 50 | 25 | 25 |
| | NR (RSS#3) | 30 | 30 | 30 | 30 | — | — | — |
| | BR[5] | — | — | — | — | — | 10 | 20 |
| | Carbon black[6] | 30 | 30 | 30 | 30 | 30 | 30 | 30 |
| | Stearic acid | 1 | 1 | 1 | 1 | 1 | 1 | 1 |
| | Zinc oxide | 3 | 3 | 3 | 3 | 3 | 3 | 3 |
| | Tackifier resin[7] | 10 | 10 | 10 | 10 | 10 | 10 | 10 |
| | Antioxidant[8] | 1 | 1 | 1 | 1 | 1 | 1 | 1 |
| | Vulcanization accelerator[9] | 1.5 | 1.5 | 1.5 | 1.5 | 1.5 | 1.5 | 1.5 |
| | Sulfur | 1.05 | 1.05 | 1.05 | 1.05 | 1.05 | 1.05 | 1.05 |
| Adhesion strength (N/25-mm) | | 60 | 20 | 30 | 55 | 70 or more* | 65 | 55 |
| State of peeling | | Interfacial peeling | Interfacial peeling | Interfacial peeling | Interfacial peeling | Matrix destruction | Interfacial peeling | Interfacial peeling |

(Solvent: toluene 1000 parts by mass)
*In Examples 1 to 3, the adhesion strength was so strong that peeling did not take place in the interface; instead, the rubber matrix was destructed.
(Solvent: toluene 1000 parts by mass)
*In Example 8, the adhesion strength was so strong that peeling did not take place in the interface; instead, the rubber matrix was destructed.
Notes:
[1]ENR 25: Epoxidized natural rubber with the epoxidation rate of 25% (trade name: ENR 25, manufactured by RRIM Corp.)
[2]ENR 50: Epoxidized natural rubber with the epoxidation rate of 50% (trade name: ENR 50, manufactured by RRIM Corp.)
[3]ENR 10: Epoxidized natural rubber with the epoxidation rate of 10% (trade name: ENR-10, manufactured by Kumpulan Guthurie Berhad)
[4]ENR 60: Epoxidized natural rubber with the epoxidation rate of 60% (trade name: ENR-60, manufactured by MUANG MAI GUTHURIE)
[5]BR: "BR 01" (manufactured by JSR Corp.)
[6]Carbon black: "SEAST NB" (manufactured by Tokai Carbon Co., Ltd.)
[7]Tackifier resin: "KORESIN" (manufactured by BASF AG) (phenolic type)
[8]Antioxidant: "ANTIGEN 6C" (manufactured by Sumitomo Chemical Co., Ltd.) (chemical name: N-phenyl-N'-1,3-dimethylbutyl-p-phenylenediamine)
[9]Vulcanization accelerator ("NOCCELER CZ-G", manufactured by Ouchi Shinko Chemical Industrial Co., Ltd.) (chemical name: N-cyclohexyl-2-benzothiazole sulfenamide)

As can be seen in Table 1, the vulcanized laminate bodies of EXAMPLES 1 to 10, in which two kinds of ENR having different epoxidation rates were used, showed far higher adhesion strength as compared with COMPARATIVE EXAMPLES 1 to 4 in which one kind of ENR was used. In addition, when comparison was made as to the vulcanized laminate bodies between EXAMPLES 1 to 3 and EXAMPLES 4 to 10, the vulcanized laminate bodies of therein as the rubber component with the amount thereof being 10 parts by mass and 20 parts by mass, respectively, in EXAMPLES 4 and 5, and ENR was blended 30 parts by mass, respectively, as the rubber component.

INDUSTRIAL APPLICABILITY

The pressure-sensitive adhesive composition of the present invention can provide the laminate body firmly bonded between the resin film layer and the rubber elastic body layer; and this laminate body can be used suitably as the member material of the inner liner layer for a pneumatic tire, so that the pneumatic tire having the inner liner layer whose adhesion strength with the carcass ply coating rubber layer is improved can be obtained.

REFERENCE SIGNS LIST

1: Bead core
2: Carcass layer
3: Inner liner layer
4: Belt part
5: Tread part
6: Side wall part
11: Modified ethylene-vinyl alcohol copolymer layer
12a and 12b: Thermoplastic urethane elastomer layer
13: Resin film layer
14: Rubber elastic body layer
15: Pressure-sensitive adhesive layer

The invention claimed is:

1. A laminate body comprising (A) a resin film layer and (B) a rubber elastic body layer which are bonded together via (C) a layer of a pressure-sensitive adhesive composition,
wherein the pressure-sensitive adhesive composition comprises, as a rubber component, at least two modified rubbers modified with a polar functional group and having different modification rates with each other;
wherein 80 to 100% by mass of the rubber component is the modified rubbers;
wherein the modified rubber is a combination of at least two modified rubbers of (a) a modified rubber with the modification rate of 5 to 30% by mol and (b) a modified rubber with the modification rate of 40 to 90% by mol; and
wherein the pressure-sensitive adhesive composition further comprises a vulcanization accelerator, and a use amount of the vulcanization accelerator is in the range of 0.1 to 5.0 parts by mass, relative to 100 parts by mass of the rubber component.

2. A pneumatic tire having the laminate body according to claim 1 as an inner liner layer.

3. The laminate body according to claim 1, wherein the resin film layer is a thermoplastic urethane elastomer.

4. The laminate body according to claim 1, comprising, as the rubber component, at least two modified natural rubbers having different modification rates with each other.

5. The laminate body according to claim 1, wherein the composition further contains a vulcanizing agent, or a vulcanizing agent and a vulcanization accelerator.

6. The laminate body according to claim 1, wherein the polar functional group is at least one kind selected from an epoxy group, an amino group, an imino group, a nitrile group, an ammonium group, an isocyanate group, an imido group, an amide group, a hydrazo group, an azo group, a diazo group, a hydroxyl group, a carboxyl group, a carbonyl group, an oxycarbonyl group, a sulfide group, a disulfide group, a sulfonyl group, a sulfinyl group, a thiocarbonyl group, a nitrogen-containing heterocyclic group, an oxygen-containing heterocyclic group, an alkoxy silyl group, and a tin-containing group.

7. The laminate body according to claim 1, wherein the modified rubber is a modified natural rubber.

* * * * *